(12) United States Patent
Tin

(10) Patent No.: US 7,940,423 B2
(45) Date of Patent: May 10, 2011

(54) GENERATING A DEVICE INDEPENDENT INTERIM CONNECTION SPACE FOR SPECTRAL DATA

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 732 days.

(21) Appl. No.: 11/948,977

(22) Filed: Nov. 30, 2007

(65) Prior Publication Data
US 2009/0141322 A1     Jun. 4, 2009

(51) Int. Cl.
*H04N 1/46* (2006.01)
(52) U.S. Cl. ......... 358/1.9; 358/535; 345/603; 345/604; 348/221.1; 348/655
(58) Field of Classification Search .................. 358/1.8, 358/1.9, 2.1, 3.23, 535; 348/222.1, 655; 345/603, 604
See application file for complete search history.

(56) References Cited

U.S. PATENT DOCUMENTS

| | | | |
|---|---|---|---|
| 5,543,940 A * | 8/1996 | Sherman | 358/518 |
| 5,771,311 A * | 6/1998 | Arai | 382/162 |
| 5,864,834 A * | 1/1999 | Arai | 706/16 |
| 5,903,275 A | 5/1999 | Guay | 345/430 |
| 5,905,543 A * | 5/1999 | van Trigt | 348/708 |
| 6,008,907 A | 12/1999 | Vigneau et al. | 358/1.9 |
| 6,587,793 B2 | 7/2003 | Viassolo et al. | 702/27 |
| 6,639,628 B1 * | 10/2003 | Lee et al. | 348/223.1 |
| 6,698,860 B2 | 3/2004 | Berns et al. | 347/15 |
| 6,850,342 B2 | 2/2005 | Woolfe et al. | 358/1.9 |
| 6,912,306 B1 | 6/2005 | Nakabayashi et al. | 382/167 |
| 6,920,244 B2 | 7/2005 | Rosen et al. | 382/162 |
| 6,952,494 B2 * | 10/2005 | Odagiri et al. | 382/162 |
| 7,072,511 B2 | 7/2006 | Tan et al. | 382/167 |
| 7,081,925 B2 | 7/2006 | Yang et al. | 348/655 |
| 7,180,629 B1 * | 2/2007 | Nishio et al. | 358/1.9 |
| 7,184,057 B2 | 2/2007 | Stokes et al. | |
| 7,227,586 B2 * | 6/2007 | Finlayson et al. | 348/655 |
| 7,751,639 B1 * | 7/2010 | Finlayson et al. | 382/254 |
| 2002/0165684 A1 | 11/2002 | Olson | 702/85 |
| 2002/0196972 A1 | 12/2002 | Bayramoglu et al. | |
| 2003/0072037 A1 * | 4/2003 | Hamilton | 358/3.28 |
| 2003/0142222 A1 * | 7/2003 | Hordley | 348/223.1 |
| 2005/0068550 A1 * | 3/2005 | Braun | 358/1.9 |
| 2005/0069200 A1 | 3/2005 | Speigle et al. | |

(Continued)

OTHER PUBLICATIONS

Yoshifumi Arai, et al., "Device-and-illuminant independent color reproduction using principal component analysis and neural networks", SPIE vol. 2414, pp. i-iv and 115-112 (Feb. 1995).*

(Continued)

*Primary Examiner* — Kimberly A Williams
(74) *Attorney, Agent, or Firm* — Fitzpatrick, Cella, Harper & Scinto

(57) ABSTRACT

Generation of an Interim Connection Space (ICS) of a full spectral space is provided. A space of illuminants is accessed, and the full spectral space is decomposed into a first subspace that is an orthogonal complement of a metameric black subspace for the space of illuminants. The Interim Connection Space is generated based on the first subspace. The generated ICS can be used, for example, for rendering an image on an additive color destination device. One image rendering workflow includes accessing color data of the image in an ICS, transforming the color data from the ICS into a device dependent color space of an additive color destination device, and rendering the transformed color data on the destination device.

22 Claims, 10 Drawing Sheets

U.S. PATENT DOCUMENTS

| | | | | |
|---|---|---|---|---|
| 2005/0117948 | A1 | 6/2005 | Hatta et al. | 400/62 |
| 2007/0065006 | A1* | 3/2007 | Wilensky | 382/167 |
| 2007/0132759 | A1* | 6/2007 | Mallick et al. | 345/426 |
| 2008/0285844 | A1* | 11/2008 | Romney | 382/162 |
| 2009/0040564 | A1* | 2/2009 | Granger | 358/2.1 |
| 2010/0074539 | A1* | 3/2010 | Friedhoff | 382/224 |

OTHER PUBLICATIONS

International Search Report and Written Opinion dated Jan. 29, 2009 in counterpart PCT/US2008/012869.

Tsutsumi, et al. "Spectral Reproduction Using LabPQR: Inverting the Fractional Area Coverage to Spectra Relationship", Proc. ICIS, pp. 107-110 (2006).

Rosen, et al. "Spectral Gamuts and Spectral Gamut Mapping", SPIE IS&T vol. 6062.

Romney, et al., "Munsell Reflectance Spectra in 3-D Euclidean Space", Color Research & Application, vol. 128, No. 3, pp. 182-196, Jun. 2003.

Greenburg, "A Framework for Realistic Image Synthesis", Communications of the ACM, vol. 42, No. 8, pp. 45-53, Aug. 1999.

ISO/TR 16066:2003(E), "Graphic Technology—Standard Object Color Spectra Database for Color Reproduction Evaluation" (SOCS), ISO (2003).

Li, et al., "Color Constancy Based on Reflectance Functions", Proc. 14th CIC, pp. 175-179 (2006).

U.S. Appl. No. 11/609,280, filed Dec. 11, 2006, entitled "Constructing Basis Functions Using Sensor Wavelength Dependence" by Siu-Kei Tin.

U.S. Appl. No. 11/954,184, filed Dec. 11, 2007, entitled "Spectral Gamut Mapping Based on a Colorimetric Gamut Mapping" by Siu-Kei Tin.

U.S. Appl. No. 11/947,741, filed Nov. 29, 2007, entitled "Generating an Interim Connection Space for Spectral Data" by Siu-Kei Tin.

U.S. Appl. No. 11/947,487, filed Nov. 30, 2007, entitled "Generating a Transformed Interim Connection Space for Spectral Data" by Siu-Kei Tin.

U.S. Appl. No. 12/011,318, filed Jan. 23, 2008, entitled "Gamut Mapping in Spectral Space Based on an Objective Function" by Siu-Kei.

Johnson, Garrett M., and Fairchild, Mark D. "Full-Spectral Color Calculations in Realistic Image Synthesis", Rochester Institute of Technology, IEEE Computer Graphics and Applications, pp. 1-7 (1999).

Wyszecki, Gunter, and Stiles, W.S., Color Science: Concepts and Methods, Quantitative Data and Formulae, 2nd Edition, John Wiley & Sons, pp. 144-146 (1982).

Tsutsumi, Shohei, Rosen, Mitchell R., and Berns, Roy S., "Spectral Color Management using Interim Connection Spaces based on Spectral Decomposition", Proc. 14th CIC, pp. 246-251 (2006).

Rosen, Mitchell R. and Ohta, Noboru, "Spectral Color Processing using an Interim Connection Space", Proc. 11th CIC, pp. 187-192 (2003).

Derhak, Maxim W. and Rosen, Mitchell R., "Spectral Colorimetry Using LabPQR-An Interim Connection Space", Proc. 12th CIC, pp. 246-250 (2004).

Rosen, et al., "Answering Hunt's Web Shopping Challenge: Spectral Color Management for a Virtual Swatch", Proc. Of the IS&T/SID 9th Color Imaging Conference, pp. 267-272.

* cited by examiner

GENERATING A DEVICE INDEPENDENT INTERIM CONNECTION SPACE FOR SPECTRAL DATA

BACKGROUND OF THE INVENTION

1. Field of the Invention

This invention pertains to Interim Connection Spaces for spectral data, and in particular, to the generation of Interim Connection Spaces for spectral data based on a space of illuminants.

2. Related Background Art

There is an increasing trend for color imaging applications to process and utilize spectral data, and/or to perform color processing in a spectral color space. For example, it has become common to characterize color devices such as scanners, cameras, printers and displays, in terms of their spectral responsivity, such as by obtaining a so-called spectral device profile. Once a spectral characterization of a device is obtained, operations such as transforming color data from a source device to a destination device, gamut mapping, etc., can be performed in the full spectral space.

As another example, some modern image capture devices can capture color image data in spectral or extended color spaces. In this regard, the use of spectral data such as spectral reflectance of objects and spectral power distribution of illuminants promises to yield even more advantages in the near future. Ultimately, one goal of spectral color reproduction is to produce color reproductions with remarkably high color fidelity, perhaps even matching the original scene on the spectral level. In the case of reflective objects, for example, a reproduction with a spectral match would have the same color as the original object under any illuminant.

Spectral characterization of color devices, and development of multi-spectral devices such as multi-spectral cameras and multi-spectral printers, could form the basis of a spectral color management workflow that can have very useful applications in everyday consumer products. For example, such technologies could allow online shoppers to print their own "virtual swatches" of fabrics, as detailed in the paper "Answering Hunt's Web Shopping Challenge: Spectral Color Management for a Virtual Swatch" by Rosen et al., Proceedings of the IS&T/SID $9^{th}$ Color Imaging Conference, pp. 267-272. Another application of spectral color management in computer aided design/computer aided manufacturing (CAD/CAM) applications allows manufacturers to visualize and demonstrate preliminary design ideas by simulation, before actually building a costly prototype.

While the use of spectral data can provide many advantages, such as reducing metameric color shifts, using spectral data presents some challenges. In particular, the dimensionality of spectral data typically is high compared to other types of data, such as calorimetric data. For example, conventional colorimetry-based spaces such as CIEXYZ, CIELAB, and CIECAM02, etc., have three dimensions, while full spectral space typically has thirty-one dimensions or more. This high dimensionality can significantly increase the amount of data that must be manipulated and/or stored by applications utilizing full spectral data. Consequently, these applications can suffer from increased memory requirements and decreased computational performance.

A known approach to this problem is the construction of Interim Connection Spaces (ICSs), which are of lower dimensionality than the full spectral space, for example, with five or higher dimensions as opposed to the 31 or higher dimensions of a full spectral space. In particular, typical Interim Connection Spaces provide a way to project full spectral data to lower-dimensional data with a small loss of accuracy. Processing can then occur on the lower-dimensional data, and if needed, results of the processing can be transformed into full spectrum data.

SUMMARY OF THE INVENTION

The inventor herein has identified drawbacks in known ICSs, which limit their usefulness. For example, typical ICSs are device dependent. In other words, construction of typical ICSs depends upon device-specific information, such as printer spectral measurements. As a result, the practical applicability of typical ICSs can be limited to a particular device.

To address the foregoing, the present invention provides for generation of novel device independent Interim Connection Spaces, which are particularly useful and accurate for the series of daylight illuminants.

In one example embodiment of the present invention, a set of illuminants is accessed. For example, the illuminants can be the CIE daylight illuminants. The full spectral space is decomposed into a first subspace that is an orthogonal complement of a metameric black space for the illuminants, and the Interim Connection Space is generated based on the first subspace. Because the generation of the Interim Connection Space does not depend on device data, the ICS is device independent. As a result, the ICS can have a greater range of applicability across different devices than typical ICSs, which are device dependent.

In this embodiment of the present invention, the first subspace may be obtained by singular value decomposition. In this case, decomposing the full spectral space can include defining the first subspace to be the span of singular vectors that correspond to only non-zero singular values.

Also in this embodiment, an upper bound for the dimension value may be accessed, and when decomposing the full spectral space, the decomposition may include further restricting the dimension of the first subspace to the upper bound for the dimension value.

The Interim Connection Space generated can include a linear map characterizing a linear transformation from the Interim Connection Space to the full spectral space, and a linear map characterizing a linear transformation from the full spectral space to the Interim Connection Space.

In another example embodiment of the present invention, a set of basis functions of a space of illuminants is accessed. For example, the set of basis functions can be the basis functions for the CIE model of daylight. A first matrix is generated comprising tristimulus color values of the basis functions at predetermined wavelengths. The first matrix is decomposed to obtain a second matrix of singular column vectors. The Interim Connection Space is generated based on the second matrix. Similar to the previous embodiment, the ICS is device independent. In addition, the ICS is optimized for the CIE model of daylight, which is a well known and often used model of illuminants. Of course, the invention is not restricted to the use of the CIE model of daylight. Rather, any set of basis functions of any space of illuminants can be used.

In this embodiment of the present invention, an upper bound for dimension value may be accessed, and when decomposing the first matrix, the decomposing may include restricting the number of nonzero columns of the second matrix to the upper bound.

In another example embodiment of the present invention, an image is transformed to be rendered on a destination device. In this example embodiment, spectral color data of the image is accessed, and transformed into an Interim Connection Space generated by a method of the invention, to obtain color data in the Interim Connection Space. The color data can be stored for future use. During rendering of the image to a destination device, the color data in the Interim Connection Space is accessed, then transformed into a device dependent color space of a destination device. In particular, in a simulation of the appearance of an object (spectral reflectance) under certain illuminant using a conventional destination device such as an RGB monitor, transforming the color data from the Interim Connection Space color data may include performing an integration of the spectral reflectance data, the spectral power distribution of the illuminant, and color matching functions, followed by color appearance adaptation to the destination viewing conditions of the monitor.

The invention may be embodied in a method, apparatus or computer-executable program code.

The generated ICSs can provide several benefits. For example, since the ICSs are generated independently of device-specific data, an ICS of the present invention can have wider applicability than a typical ICS. In addition, the present ICSs can provide more accurate results for the chosen space of illuminants in many applications.

This brief summary has been provided so that the nature of the invention may be understood quickly. A more complete understanding of the invention can be obtained by reference to the following detailed description in connection with the attached drawings.

DETAILED DESCRIPTION OF EXAMPLE EMBODIMENTS

Figure 1:
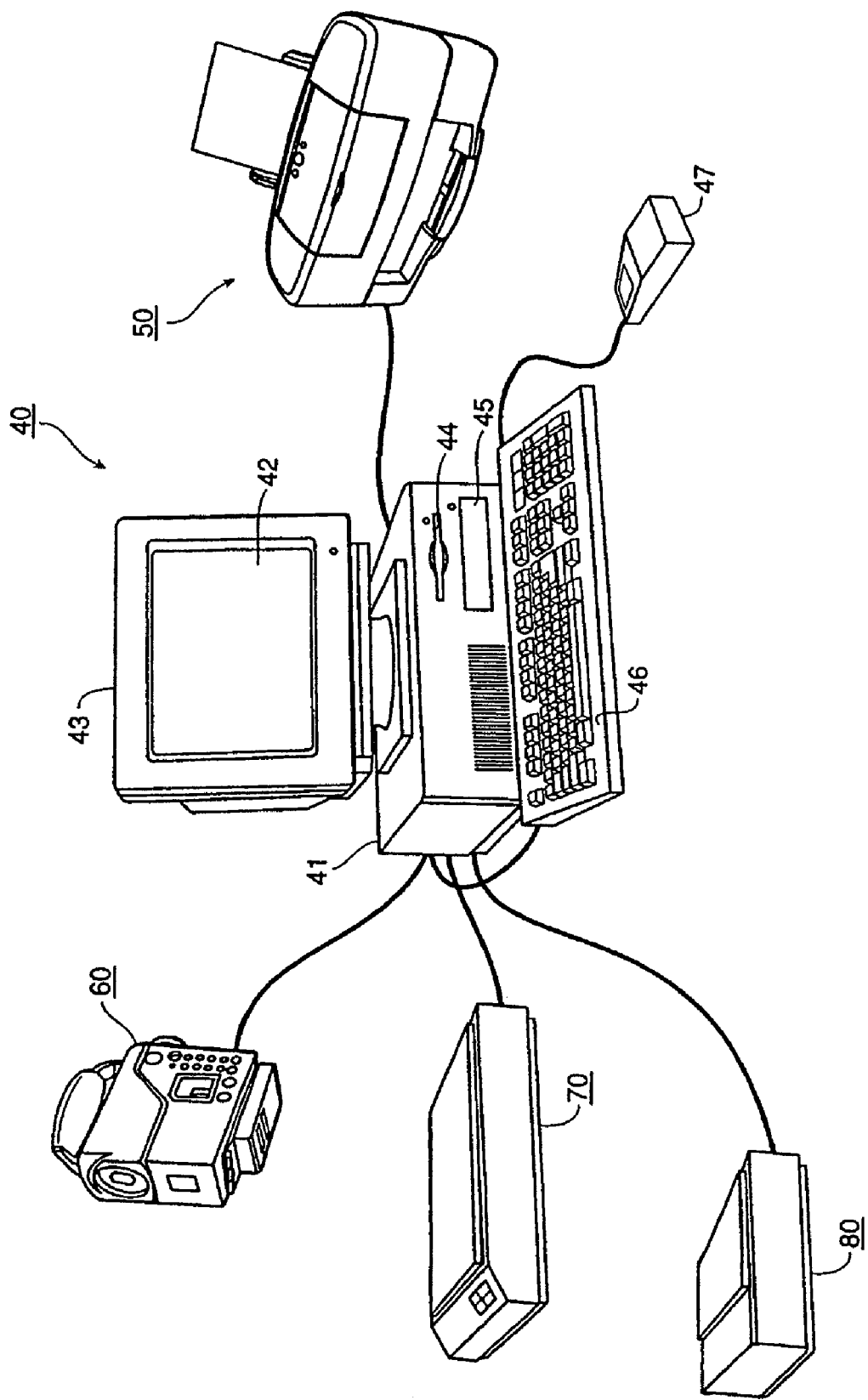
FIG. 1 is a perspective view of an exemplary computing environment in which the present invention may be implemented.

FIG. 1 is a perspective view of a representative computing system including a data processing system 40, peripherals and digital devices that may be used in connection with the practice of the present invention. Data processing system 40 includes host processor 41, which comprises a personal computer (hereinafter "PC"). Provided with data processing system 40 are color monitor 43 including display screen 42, keyboard 46 for entering text data and user commands, and pointing device 47. Pointing device 47 can comprise a mouse and/or a pen-style input device (not shown) for pointing and for manipulating objects displayed on display screen 42.

Data processing system 40 includes a computer-readable memory medium such as computer fixed disk 45 and/or floppy disk drive 44. Floppy disk drive 44 provides a means whereby data processing system 40 can access information, such as image data, computer-executable process steps, application programs, etc. stored on removable memory media. A similar CD-ROM interface (not shown) may be provided for data processing system 40 through which data processing system 40 can access information stored on removable CD-ROM media.

Printer 50 is a printer, such as a color bubble jet printer, which forms color images on a recording medium such as paper or transparencies or the like. In addition, digital color scanner 70 is provided for scanning documents and images into data processing system 40 and digital color camera 60 is provided for sending digital images to data processing system 40. Of course, data processing system 40 may acquire digital image data from other sources such as a digital video camera, a server on a local area network, the Internet, etc. (not shown). A spectrophotometer 80 may be provided for measuring the spectral reflectance of a color sample, and sending the spectral data to data processing system 40.

Figure 2:
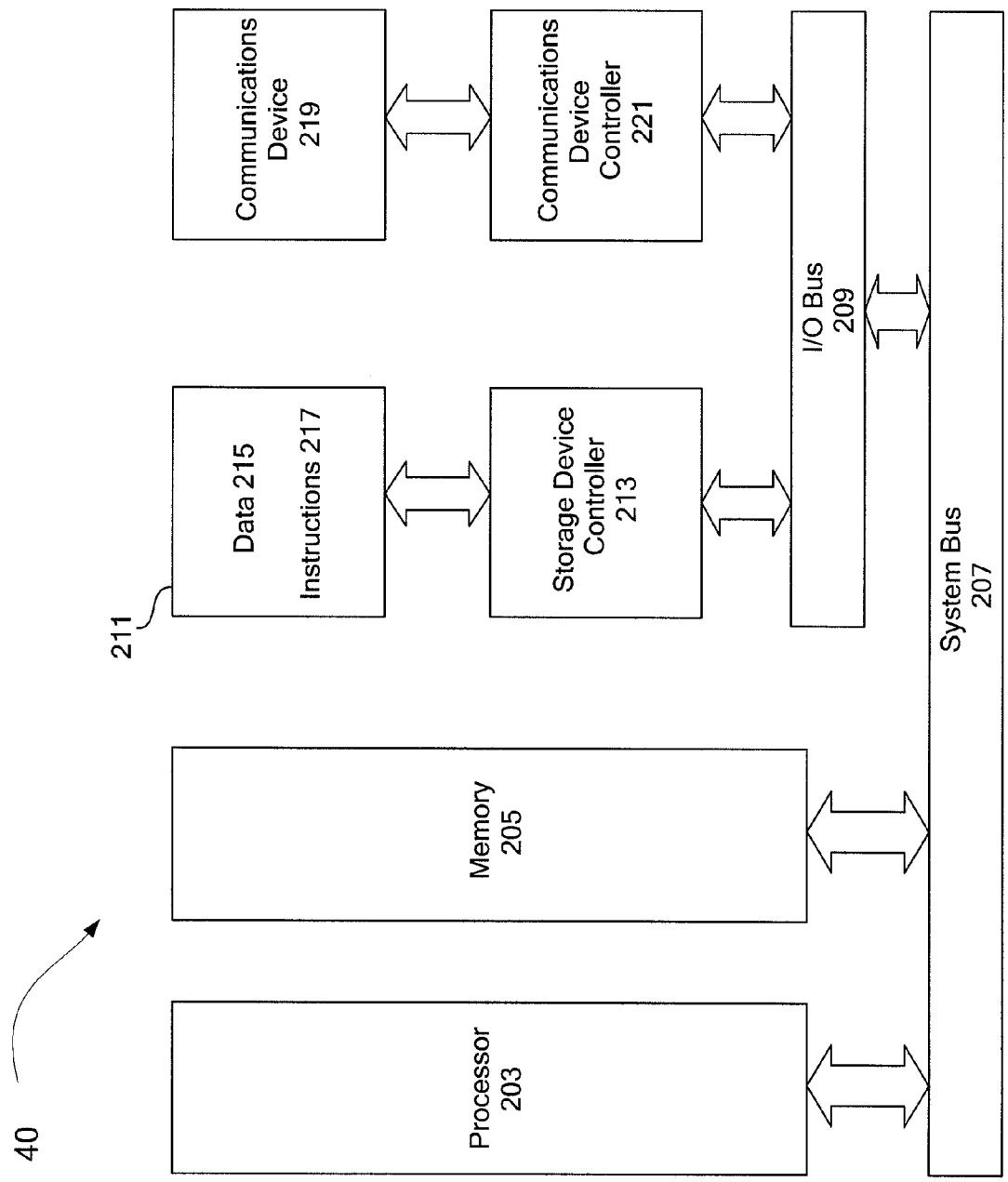
FIG. 2 is a block diagram of an exemplary computer architecture in which the present invention may be implemented.

FIG. 2 is an architecture diagram of an exemplary data processing system 40. Data processing system 40 includes a processor 203 coupled to a memory 205 via system bus 207. The processor is also coupled to external Input/Output (I/O) devices (not shown) via the system bus 207 and an I/O bus 209. A storage device 211 having a computer-readable medium is coupled to the processor 203 via a storage device controller 213 and the I/O bus 209 and the system bus 207. The storage device 211 is used by the processor 203 and controller 213 to store and read/write data 215 and program instructions 217 used to implement the procedures described below.

The processor 203 may be further coupled to a communications device 219 via a communications device controller 221 coupled to the I/O bus 209. The processor 203 uses the communications device 219 to communicate with a network (not shown).

In operation, the processor 203 loads the program instructions 217 from the storage device 211 into the memory 205. The processor 203 then executes the loaded program instructions 217 to perform any of the methods described below. Thus, processor 203 operates under the control of the instructions 217 to perform the methods of the present invention, as described in more detail below.

Figure 10:
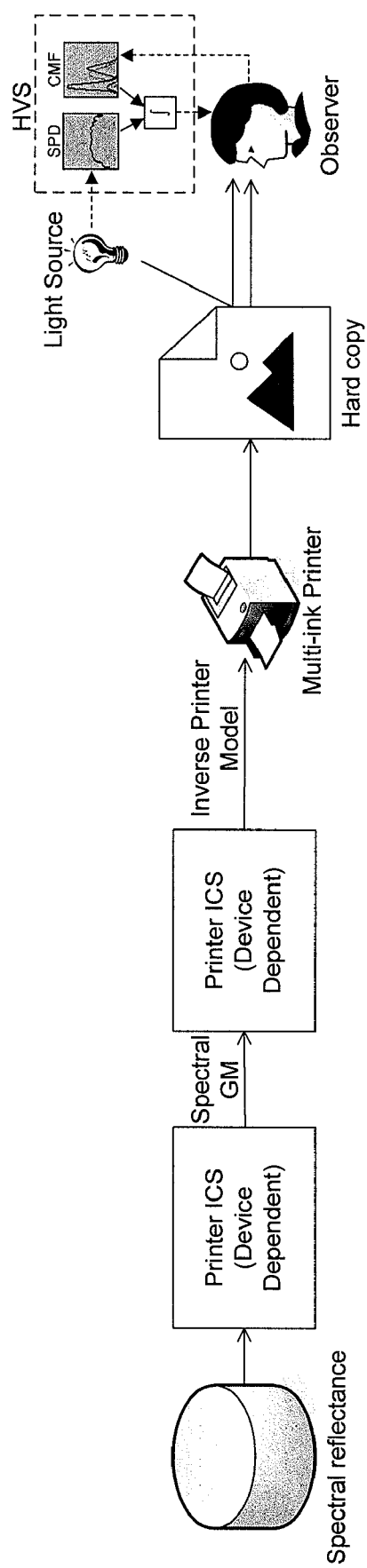
FIG. 10 is a representational diagram of a printer workflow.

Typical ICSs are device dependent, and device dependent ICSs are acceptable for many applications. For example, FIG. 10 shows an example printer workflow in which a device dependent ICS may be implemented. In this case, for example, a target spectral reflectance has been obtained by some means (e.g. a multi-spectral camera). The spectral reflectance is projected onto an ICS, a spectral gamut mapping occurs inside this ICS to the effect that the mapped ICS value lies within the printer spectral gamut, then the ICS value is inverted using the spectral printer model to obtain the digital counts for the channels, which are sent to the printer driver. In this case, a printer dependent ICS is acceptable because it is known that the output will be rendered to a particular printer.

It is noted that in the case of the printer workflow shown in FIG. 10, integration of spectral reflectances with the spectral power distribution (SPD) of an illuminant and the XYZ Color Matching Functions is not part of the workflow. In this case, spectral integration takes place conceptually inside the human observer, who is simply looking at the hard copy from a printer. One consequence is that the user can take the hard copy anywhere, potentially under very different light sources. Because the ICS needs to be accurate for all possible light sources, information about the device, i.e., the spectra it can generate, is generally needed to achieve both accuracy and low dimension of the ICS.

However, a device independent ICS might be desirable, particularly when it is not necessary to maintain high accuracy for all possible illuminants. This is the case in a simulation application using a color device, such as, for example, a conventional monitor with RGB primaries. In this case, the end user may be presented with a system in which he is only given a limited number of illuminants to choose from, but the system is capable of simulating a relative large number of colors (spectral reflectance) under the restricted set of illuminants.

Figure 3:
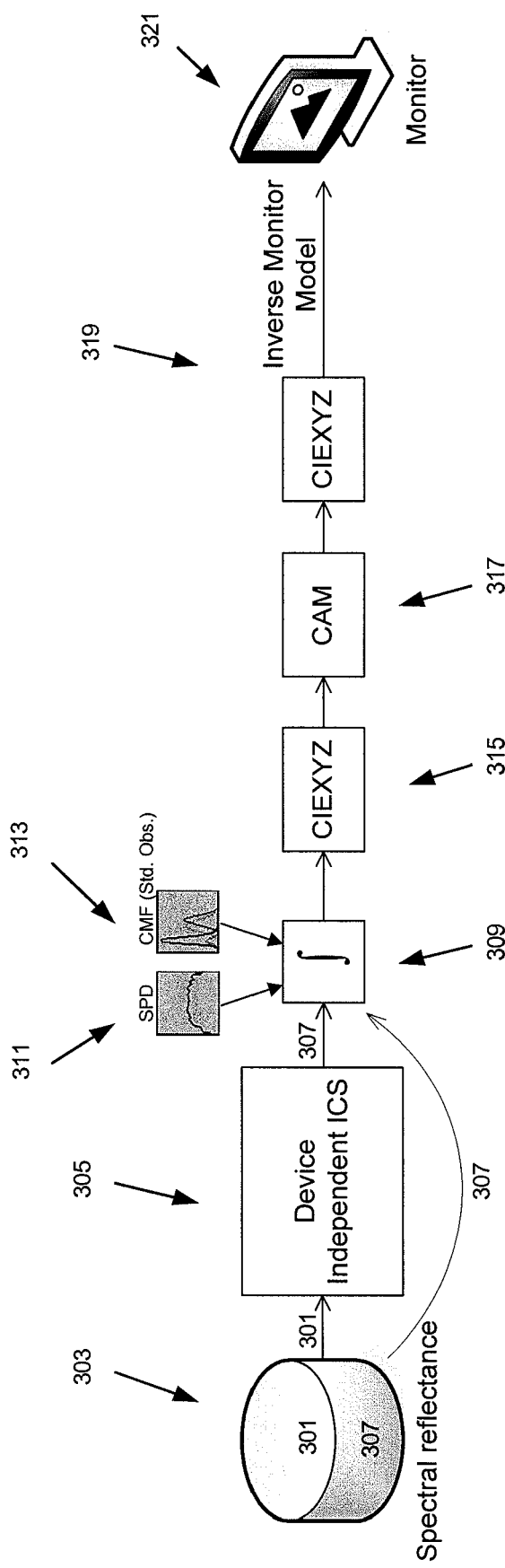
FIG. 3 is a representational diagram of an example workflow in which the present invention may be implemented.

FIG. 3 illustrates an example workflow for rendering an image on a color device. This example workflow may be used, for example, for tasks such as 3D simulation of an automobile, or "soft proofing" of printer output on a monitor. In this example workflow, the target spectral reflectance data 301, which is stored in a data store 303, is projected onto a device independent ICS 305 to form transformed data 307 in the ICS (or pre-transformed data 307, e.g., target reflectance data that have already been transformed into the ICS and stored in data store 303, is accessed), then spectral integration (309) takes place wherein the transformed data 307 is combined with an SPD 311 of an illuminant specified by a user along with the XYZ Color Matching Functions 313, for example, of the CIE Standard Observer. The resulting XYZ color data 315 then goes through a conventional calorimetric data flow that involves a color appearance model 317 and inverse device model 319 for rendering on a monitor 321.

In the example workflow of FIG. 3, monitor 321 is used for simulation, i.e., to view a representation of how an object, such as an automobile or a printed image on a sheet of paper, would appear when illuminated by the selected illuminant, which may be selectable from a plurality of illuminants. In this regard, the primary concern of such a simulation may be to provide an appearance match of the objects under the selected illuminant. In particular, the color appearance model used is typically calorimetrically based, not spectrally based. In this regard, the spectral characteristics of the monitor has no bearing on the spectral reflectance data to be simulated, and it would not be reasonable to use an ICS that is based on the spectral characteristics of the monitor to begin with. On the other hand, the primary role of the ICS in this workflow is to reduce the dimension of spectral reflectance data, which may be very high as the spectral reflectance data may come from a variety of devices/sources, not just from one printer, for example. It follows that this workflow may be one application in which a device independent ICS could be a good choice.

Figure 4:
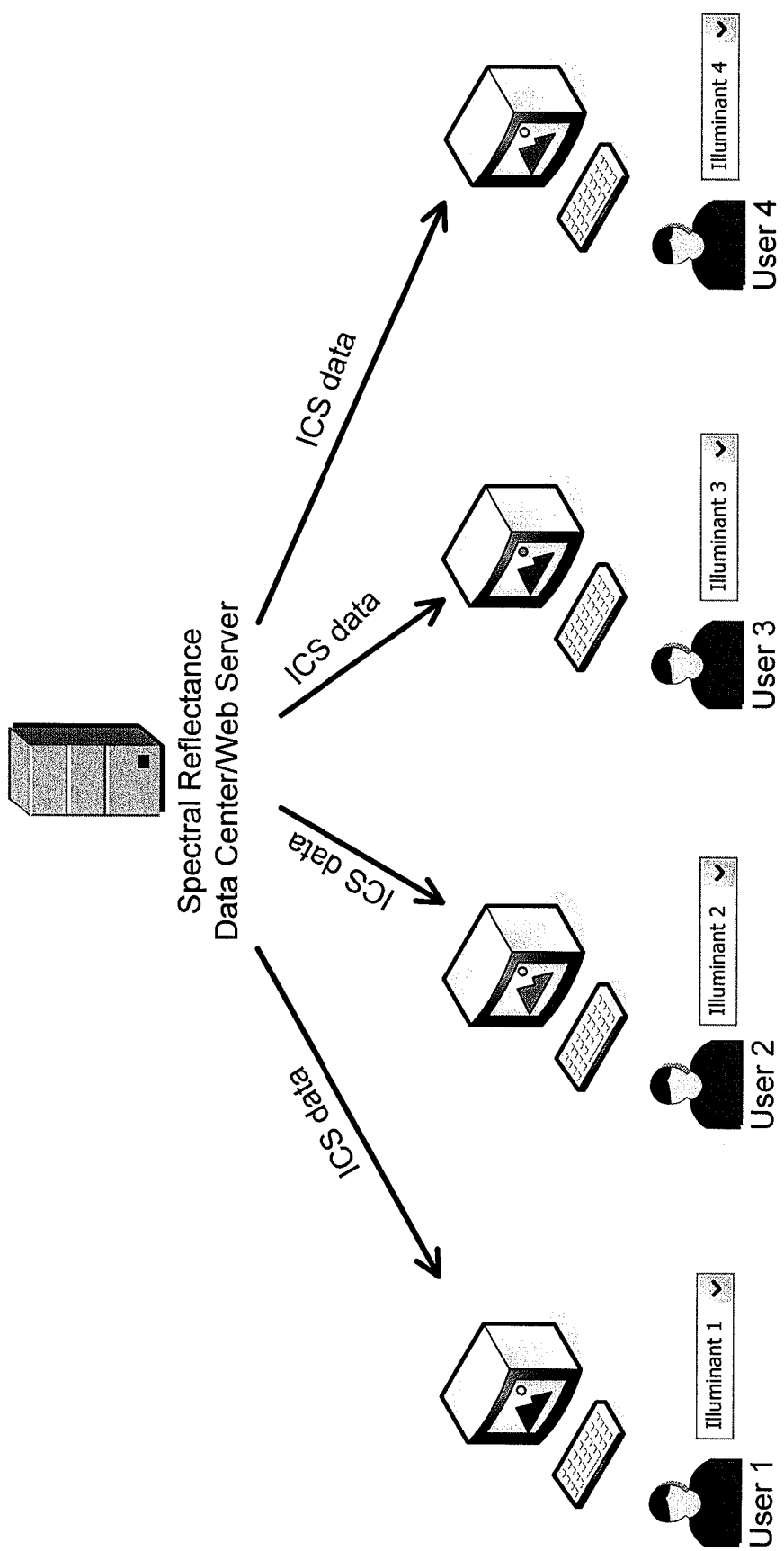
FIG. 4 is a representational diagram of an example system in which the present invention may be implemented.

FIG. 4 illustrates an example system in which the workflow of FIG. 3 can be implemented. A server computer stores spectral data of objects in a device independent format and serves as a central database for the data. The data can be stored as, for example, spectral reflectance data, or pre-transformed ICS data of spectral reflectance data already transformed into an ICS, etc. Multiple client computers are connected to the server computer via, for example, Ethernet, LAN, wireless connection, etc. When the server computer receives a request from a client computer, the server computer sends the ICS data to the client computer (if requested data is not already in ICS format, the server computer can perform the transformation on the fly). Each client computer executes the workflow depicted in FIG. 3, with the particular illuminant chosen by the user of that computer and the specific calorimetric characterization of the display connected to that computer.

Figure 5A:
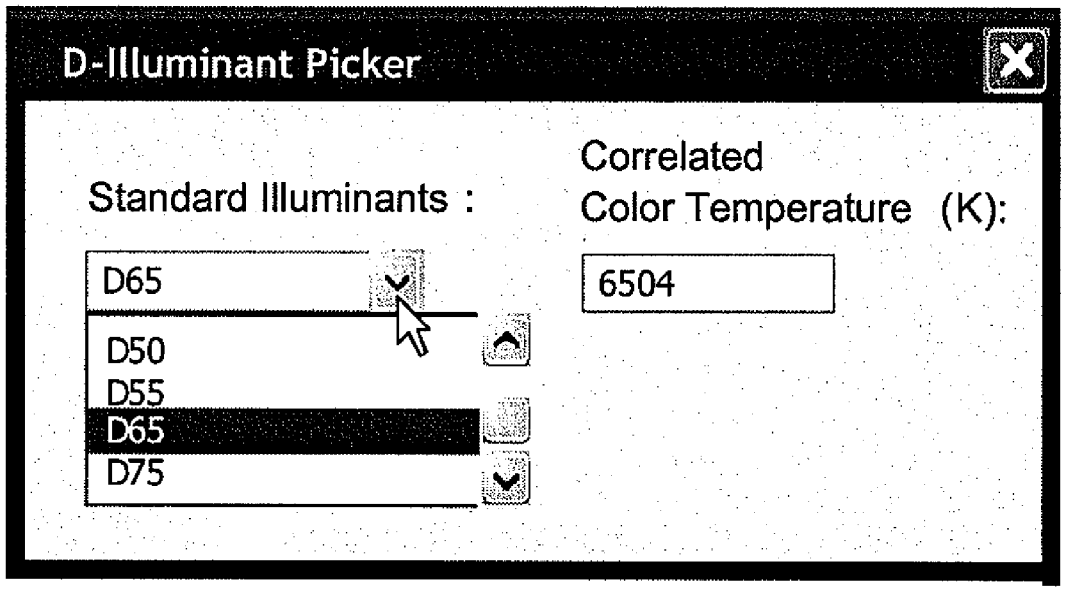
FIGS. 5A and 5B depict example graphical user interfaces (GUIs) that can be implemented in a system that utilizes one example embodiment of the present invention.
Figure 5B:
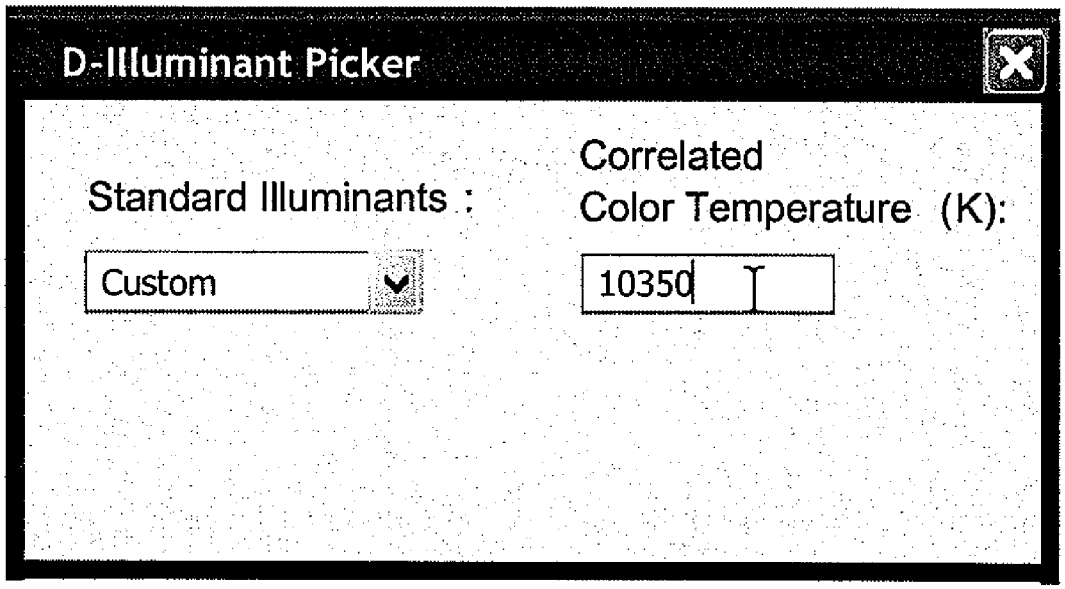

FIGS. 5A and 5B show two example graphical user interfaces (GUIs) that can be implemented in an application using the workflow of FIG. 3. In particular, the application can present a dialog box to allow the user to pick an illuminant dynamically, either from a list (FIG. 5A) or by specifying a parameter such as the Correlated Color Temperature (FIG. 5B). Thus, there exists a control over the set of illuminants to be used in the system, and the ICS can be based on this set of illuminants. Furthermore, it is noted that the ICS does not necessarily need to be as robust for illuminants that are not in this predetermined set, since it is possible to restrict the user from specifying an illuminant not in the set.

In the system of FIG. 4, one benefit of using an ICS is that the data bandwidth requirement of the network can be reduced, since full spectral data is not transmitted over the communication lines. Use of an ICS can benefit other applications as well. For example, in the case of 3D simulation, ICS data of low and suitable dimension (e.g., small multiples of 4) can be rendered on common graphics hardware. For example, Graphics Processing Units in today's middle-priced personal computers are programmable and allow ICS data to be used as "texture map" in the rendering pipeline. In sum, many applications may benefit from device independent ICSs.

Figure 6:
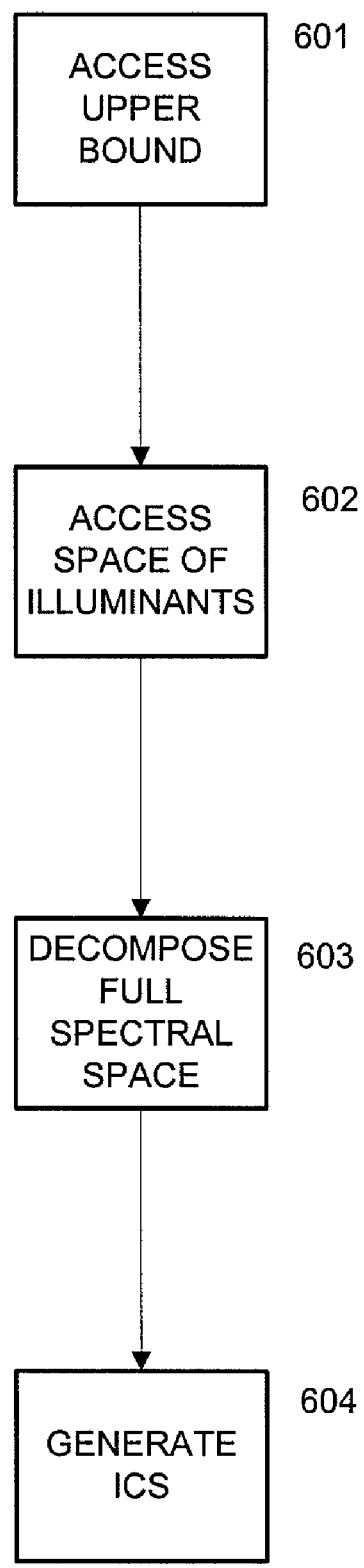
FIG. 6 is a process flowchart of one example method of generating an ICS according to one example embodiment of the present invention.

A method of generating a device independent ICS according to one example embodiment of the present invention will now be discussed with reference to FIG. 6.

Initially, an upper bound ICS dimension $n_0$ is accessed (601). The upper bound is a maximum value of dimension for the final result of the process of constructing the ICS. A likely choice for $n_0$ would be in the range of 5 to 8, for example. The upper bound will typically be a design parameter of the system determined by the engineer, perhaps through trial and error or performance tuning. It will typically be chosen to be as small as possible while achieving the accuracy requirement of the system.

A space of illuminants is accessed (602). In the present example embodiment, the CIE daylight illuminants are used, however, any space of illuminants can be used. In the CIE daylight model, illuminants are characterized by a single parameter called the Correlated Color Temperature (CCT), and there is a continuous family of illuminants for CCT's ranging from 4000K to 25000K.

In particular, in 1964, when the CIE recommended $D_{65}$ as the main standard daylight illuminant, it also recommended a procedure for computing the SPD $S(\lambda)$ of any daylight D-illuminant with CCT $T_c$ (in K) ranging from 4000K to 25000K, as follows. The chromaticity coordinates $(x_D, y_D)$ of the illuminant are calculated first, using the following equations:

$$t = 1000/T_c$$

$$x_D = \begin{cases} \dfrac{-4.6070t^3 + 2.9678t^2 +}{0.09911t + 0.244063} & \text{if } 4000 \leq T_c \leq 7000 \\ \dfrac{-2.0064t^3 + 1.9018t^2 +}{0.24748t + 0.237040} & \text{if } 7000 < T_c \leq 25000 \end{cases}$$

$$y_D = -3.000x_D^2 + 2.870x_D - 0.275$$

The SPD $S(\lambda)$ is calculated using the following equations:

$$S(\lambda) = S_0(\lambda) + M_1 S_1(\lambda) + M_2 S_2(\lambda)$$

$$M_1 = \frac{-1.3515 - 1.7703 x_D + 5.9114 y_D}{0.0241 + 0.2562 x_D - 0.7341 y_D}$$

$$M_2 = \frac{0.0300 - 31.4424 x_D + 30.0717 y_D}{0.0241 + 0.2562 x_D - 0.7341 y_D}$$

Values of $S_0(\lambda)$, $S_1(\lambda)$, $S_2(\lambda)$ are shown in Table 1:

TABLE 1

Values of $S_0(\lambda)$, $S_1(\lambda)$, $S_2(\lambda)$ in wavelength range 300 nm to 830 nm

| Wavelength (nm) | $S_0$ | $S_1$ | $S_2$ |
| --- | --- | --- | --- |
| 300 | 0.04 | 0.02 | 0.00 |
| 305 | 3.02 | 2.26 | 1.00 |
| 310 | 6.00 | 4.50 | 2.00 |
| 315 | 17.80 | 13.45 | 3.00 |
| 320 | 29.60 | 22.40 | 4.00 |
| 325 | 42.45 | 32.20 | 6.25 |
| 330 | 55.30 | 42.00 | 8.50 |
| 335 | 56.30 | 41.30 | 8.15 |
| 340 | 57.30 | 40.60 | 7.80 |
| 345 | 59.55 | 41.10 | 7.25 |
| 350 | 61.80 | 41.60 | 6.70 |
| 355 | 61.65 | 39.80 | 6.00 |
| 360 | 61.50 | 38.00 | 5.30 |
| 365 | 65.15 | 40.20 | 5.70 |
| 370 | 68.80 | 42.40 | 6.10 |
| 375 | 66.10 | 40.45 | 4.55 |
| 380 | 63.40 | 38.50 | 3.00 |
| 385 | 64.60 | 36.75 | 2.10 |
| 390 | 65.80 | 35.00 | 1.20 |
| 395 | 80.30 | 39.20 | 0.05 |
| 400 | 94.80 | 43.40 | −1.10 |
| 405 | 99.80 | 44.85 | −0.80 |
| 410 | 104.80 | 46.30 | −0.50 |
| 415 | 105.35 | 45.10 | −0.60 |
| 420 | 105.90 | 43.90 | −0.70 |
| 425 | 101.35 | 40.50 | −0.95 |
| 430 | 96.80 | 37.10 | −1.20 |
| 435 | 105.35 | 36.90 | −1.90 |
| 440 | 113.90 | 36.70 | −2.60 |
| 445 | 119.75 | 36.30 | −2.75 |
| 450 | 125.60 | 35.90 | −2.90 |
| 455 | 125.55 | 34.25 | −2.85 |
| 460 | 125.50 | 32.60 | −2.80 |
| 465 | 123.40 | 30.25 | −2.70 |
| 470 | 121.30 | 27.90 | −2.60 |
| 475 | 121.30 | 26.10 | −2.60 |
| 480 | 121.30 | 24.30 | −2.60 |
| 485 | 117.40 | 22.20 | −2.20 |
| 490 | 113.50 | 20.10 | −1.80 |
| 495 | 113.30 | 18.15 | −1.65 |
| 500 | 113.10 | 16.20 | −1.50 |
| 505 | 111.95 | 14.70 | −1.40 |
| 510 | 110.80 | 13.20 | −1.30 |
| 515 | 108.65 | 10.90 | −1.25 |
| 520 | 106.50 | 8.60 | −1.20 |
| 525 | 107.65 | 7.35 | −1.10 |
| 530 | 108.80 | 6.10 | −1.00 |
| 535 | 107.05 | 5.15 | −0.75 |
| 540 | 105.30 | 4.20 | −0.50 |
| 545 | 104.85 | 3.05 | −0.40 |
| 550 | 104.40 | 1.90 | −0.30 |
| 555 | 102.20 | 0.95 | −0.15 |
| 560 | 100.00 | 0.00 | 0.00 |
| 565 | 98.00 | −0.80 | 0.10 |
| 570 | 96.00 | −1.60 | 0.20 |
| 575 | 95.55 | −2.55 | 0.35 |
| 580 | 95.10 | −3.50 | 0.50 |
| 585 | 92.10 | −3.50 | 1.30 |
| 590 | 89.10 | −3.50 | 2.10 |
| 595 | 89.80 | −4.65 | 2.65 |
| 600 | 90.50 | −5.80 | 3.20 |
| 605 | 90.40 | −6.50 | 3.65 |
| 610 | 90.30 | −7.20 | 4.10 |
| 615 | 89.35 | −7.90 | 4.40 |
| 620 | 88.40 | −8.60 | 4.70 |
| 625 | 86.20 | −9.05 | 4.90 |
| 630 | 84.00 | −9.50 | 5.10 |
| 635 | 84.55 | −10.20 | 5.90 |
| 640 | 85.10 | −10.90 | 6.70 |
| 645 | 83.50 | −10.80 | 7.00 |
| 650 | 81.90 | −10.70 | 7.30 |
| 655 | 82.25 | −11.35 | 7.95 |
| 660 | 82.60 | −12.00 | 8.60 |
| 665 | 83.75 | −13.00 | 9.20 |
| 670 | 84.90 | −14.00 | 9.80 |
| 675 | 83.10 | −13.80 | 10.00 |
| 680 | 81.30 | −13.60 | 10.20 |
| 685 | 76.60 | −12.80 | 9.25 |
| 690 | 71.90 | −12.00 | 8.30 |
| 695 | 73.10 | −12.65 | 8.95 |
| 700 | 74.30 | −13.30 | 9.60 |
| 705 | 75.35 | −13.10 | 9.05 |
| 710 | 76.40 | −12.90 | 8.50 |
| 715 | 69.85 | −11.75 | 7.75 |
| 720 | 63.30 | −10.60 | 7.00 |
| 725 | 67.50 | −11.10 | 7.30 |
| 730 | 71.70 | −11.60 | 7.60 |
| 735 | 74.35 | −11.90 | 7.80 |
| 740 | 77.00 | −12.20 | 8.00 |
| 745 | 71.10 | −11.20 | 7.35 |
| 750 | 65.20 | −10.20 | 6.70 |
| 755 | 56.45 | −9.00 | 5.95 |
| 760 | 47.70 | −7.80 | 5.20 |
| 765 | 58.15 | −9.50 | 6.30 |
| 770 | 68.60 | −11.20 | 7.40 |
| 775 | 66.80 | −10.80 | 7.10 |
| 780 | 65.00 | −10.40 | 6.80 |
| 785 | 65.50 | −10.50 | 6.90 |
| 790 | 66.00 | −10.60 | 7.00 |
| 795 | 63.50 | −10.15 | 6.70 |
| 800 | 61.00 | −9.70 | 6.40 |
| 805 | 57.15 | −9.00 | 5.95 |
| 810 | 53.30 | −8.30 | 5.50 |
| 815 | 56.10 | −8.80 | 5.80 |
| 820 | 58.90 | −9.30 | 6.10 |
| 825 | 60.40 | −9.55 | 6.30 |
| 830 | 61.90 | −9.80 | 6.50 |

Figure 7:
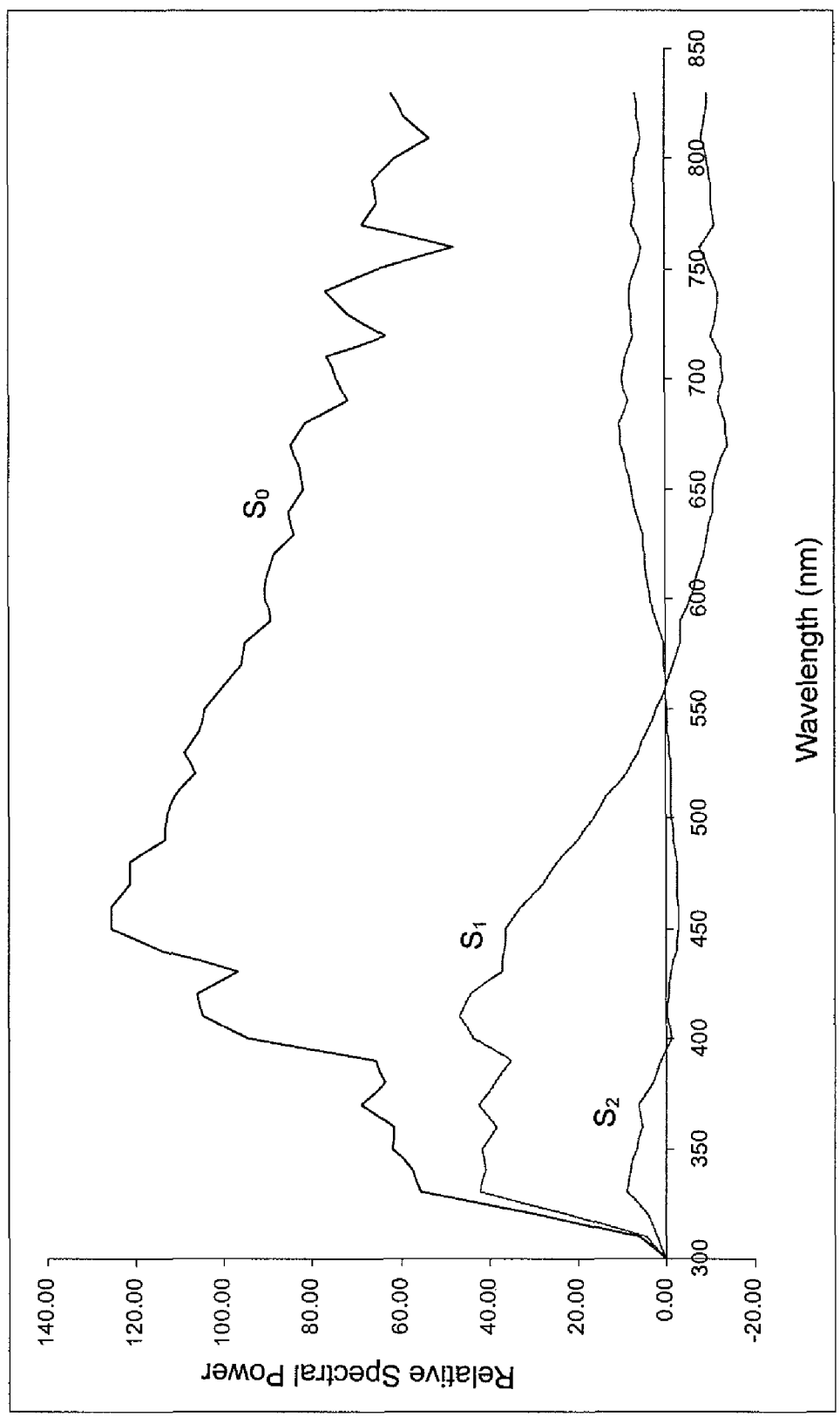
FIG. 7 is a graph of functions $S_0(\lambda)$, $S_1(\lambda)$, $S_2(\lambda)$ used in calculating a CIE daylight illuminant.

Graphs of $S_0(\lambda)$, $S_1(\lambda)$, $S_2(\lambda)$ are shown in FIG. 7. $S_0(\lambda)$ is the mean distribution, $S_1(\lambda)$ and $S_2(\lambda)$ are the first two dominant eigenvectors. The SPD of any D-illuminant can be represented as linear combination of $S_0(\lambda)$, $S_1(\lambda)$, $S_2(\lambda)$, which are basis functions of the daylight model illuminants.

In the present example embodiment, accessing (602) a space of illuminants includes accessing the set of basis functions, $S_0(\lambda)$, $S_1(\lambda)$, $S_2(\lambda)$, of the daylight illuminants. The full spectral space is decomposed (603) into a first subspace that is an orthogonal complement of a metameric black subspace for the space of illuminants.

Figure 8:
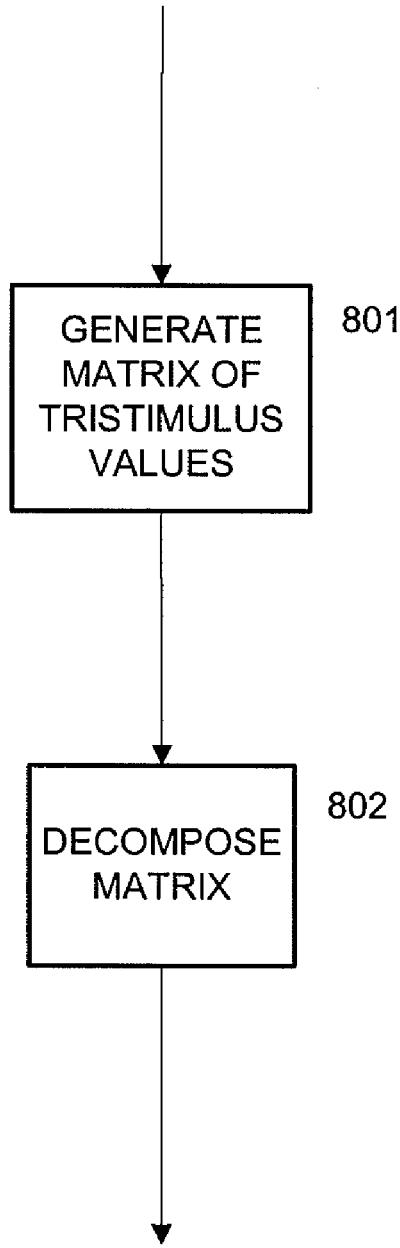
FIG. 8 an example method of decomposing a full spectral space according to one embodiment of the present invention.
Figure 9A:
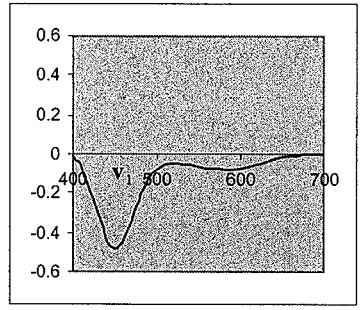
FIGS. 9A to 9I are graphs of the basis functions an ICS generated according to one embodiment of the present invention.
Figure 9B:
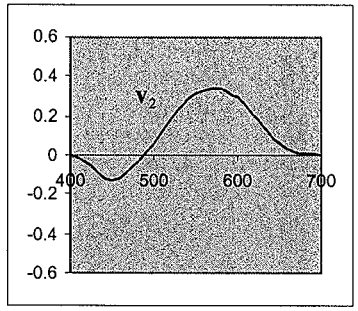
Figure 9C:
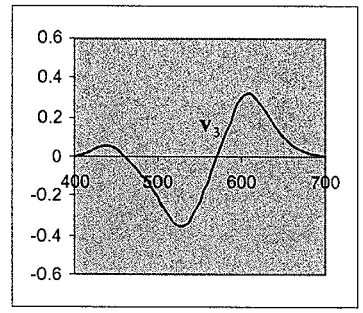
Figure 9D:
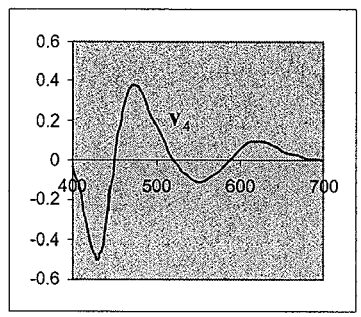
Figure 9E:
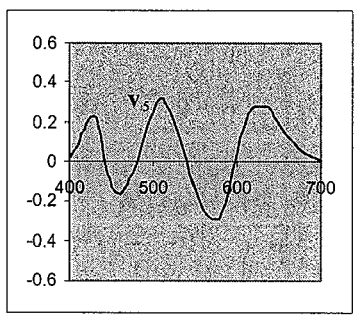
Figure 9F:
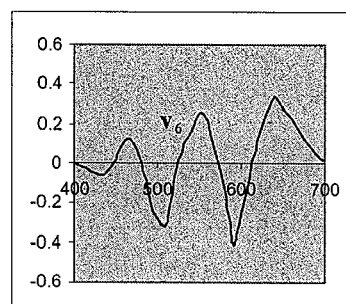
Figure 9G:
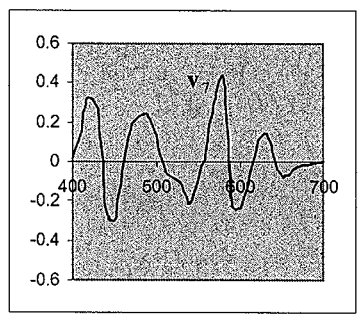
Figure 9H:
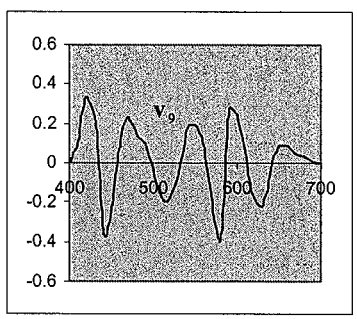
Figure 9I:
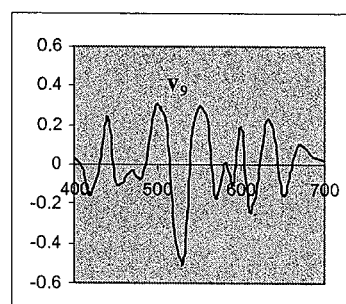

Referring now to FIG. 8 an example method of decomposing the full spectral space will now be described. The spectral reflectances are sampled in the range from a starting wavelength of $\lambda_0$, at every step size $\Delta\lambda$, for a total of N steps. For example, $\lambda_0$=400 nm, $\Delta\lambda$=10 nm, N=31. A 9×N matrix A is generated (801) as follows:

$$A = \begin{pmatrix} X_0(\lambda_0) & X_0(\lambda_0 + \Delta\lambda) & \ldots & X_0(\lambda_0 + (N-1)\Delta\lambda) \\ Y_0(\lambda_0) & Y_0(\lambda_0 + \Delta\lambda) & \ldots & Y_0(\lambda_0 + (N-1)\Delta\lambda) \\ Z_0(\lambda_0) & Z_0(\lambda_0 + \Delta\lambda) & \ldots & Z_0(\lambda_0 + (N-1)\Delta\lambda) \\ X_1(\lambda_0) & X_1(\lambda_0 + \Delta\lambda) & \ldots & X_1(\lambda_0 + (N-1)\Delta\lambda) \\ Y_1(\lambda_0) & Y_1(\lambda_0 + \Delta\lambda) & \ldots & Y_1(\lambda_0 + (N-1)\Delta\lambda) \\ Z_1(\lambda_0) & Z_1(\lambda_0 + \Delta\lambda) & \ldots & Z_1(\lambda_0 + (N-1)\Delta\lambda) \\ X_2(\lambda_0) & X_2(\lambda_0 + \Delta\lambda) & \ldots & X_2(\lambda_0 + (N-1)\Delta\lambda) \\ Y_2(\lambda_0) & Y_2(\lambda_0 + \Delta\lambda) & \ldots & Y_2(\lambda_0 + (N-1)\Delta\lambda) \\ Z_2(\lambda_0) & Z_2(\lambda_0 + \Delta\lambda) & \ldots & Z_2(\lambda_0 + (N-1)\Delta\lambda) \end{pmatrix}$$

where: for $i = 0, 1, 2$, $$X_i(\lambda) = \int_\eta \bar{x}(\eta) S_i(\eta) \delta(\eta - \lambda) \, d\eta$$

$$Y_i(\lambda) = \int_\eta \bar{y}(\eta) S_i(\eta) \delta(\eta - \lambda) \, d\eta$$

$$Z_i(\lambda) = \int_\eta \bar{z}(\eta) S_i(\eta) \delta(\eta - \lambda) \, d\eta$$

$\delta(\eta) = \max\left(0, 1 - \frac{|\eta|}{\Delta\lambda}\right)$ is the discrete impulse function and $\bar{x}(\lambda), \bar{y}(\lambda), \bar{z}(\lambda)$ are the Color Matching Functions, e.g. that of the CIE Standard Observer at 2° visual field. It is noted that the "XYZ" values in the matrix are calculated from $S_0(\lambda)$, $S_1(\lambda)$, $S_2(\lambda)$ without any normalization to the Y component of $S_0(\lambda), S_1(\lambda), S_2(\lambda)$. The matrix A represents the linear transformation from the space of spectral reflectance to the space of "XYZ" values defined above.

SVD is performed (802) on A to obtain a matrix decomposition:

$$A = UDV^T$$

where U is a 9×9 orthogonal matrix, D is a 9×N "diagonal" matrix of singular values of the form:

$$D = \begin{pmatrix} d_1 & 0 & \ldots & \ldots & \ldots & \ldots & 0 \\ 0 & d_2 & 0 & \ldots & \ldots & \ldots & 0 \\ \vdots & \ddots & \ddots & \ddots & & & \vdots \\ 0 & 0 & 0 & d_9 & 0 & \ldots & 0 \end{pmatrix},$$

with $d_1 \geq d_2 \geq \ldots \geq d_9 \geq 0$, and V is a N×N orthogonal matrix. It is noted that if $d_r$ is the last non-zero singular value ($1 \leq r \leq 9$ is the rank of A), then the last N−r columns of V form the null space of A, i.e., the metameric black space under the illuminants in question. The first r columns of V form a subspace that is orthogonal to the metameric black space. It is also noted that for the CIE model of daylight, r is exactly 9.

Referring again to FIG. 6, an ICS is generated (604) based on the first subspace. The dimension of the ICS will be n, where $n = \min(n_0, r)$. In other words, the dimension n is limited by the upper bound $n_0$. An ICS is fully specified by two linear transformations, an n×N matrix P that converts spectral reflectances to ICS values, and an N×n matrix Q that converts ICS values to spectral reflectances. For example, the ICS can be constructed based on the first n columns of V, which form an orthonormal basis for the ICS. The first n columns of V, which form an N×n matrix $V_n$, define a transformation Q:

$$Q = V_n$$

which is an N×n matrix that converts ICS values to spectral values. An n×N matrix P that converts spectral values to ICS values can be determined as follows:

$$P = V_n^T$$

The resulting ICS is denoted $D_n$, and has dimension n, which can be limited to $n_0$, as mentioned above.

It is noted that no inputs from device measurement data were used in the foregoing generation of $D_n$. Consequently, $D_n$ is device independent. It is also noted that the columns of Q are mutually orthogonal unit vectors (because they come from the orthogonal matrix V) so that $D_n$ is a subspace of the full spectral space with coordinate axes that are part of an orthonormal basis in the full spectral space. Furthermore, $PQ = I_n$ is the n×n identity matrix. As a consequence, spectra already in the subspace $D_n$ would remain fixed (i.e., won't leave $D_n$) upon further application of the projection P.

Moreover, P is in fact the product $Q^T A^+ A$ where $A^+$ is the Moore-Penrose pseudo-inverse, as shown by the following proof:

Proof. With the above SVD for A, the Moore-Penrose inverse is given by $A^+ = VD^+ U^T$, where $D^+$ is the N×9 matrix given by:

$$D^+ = \begin{pmatrix} d_1^{-1} & 0 & \ldots & 0 \\ 0 & d_2^{-1} & \ddots & \vdots \\ \vdots & 0 & \ddots & 0 \\ \vdots & & \ddots & d_9^{-1} \\ \vdots & & & 0 \\ \vdots & & & \vdots \\ 0 & \ldots & \ldots & 0 \end{pmatrix}$$

Then:

$$Q^T A^+ A = V_n^T V D^+ U^T U D V^T =$$

$$V_n^T V D^+ D V^T = V_n^T V \begin{pmatrix} I_9 & 0 \\ 0 & 0 \end{pmatrix} V^T = V_n^T V_9 V_9^T = (I_n \; 0) V_9^T = V_n^T = P.$$

Thus, $$P = Q^T A^+ A.$$

The geometric interpretation of the product $Q^T A^+ A$ is that it is a linear mapping that first converts a spectrum into an "XYZ" value in the 9-dimensional $X_0 Y_0 Z_0 X_1 Y_1 Z_1 X_2 Y_2 Z_2$ space, then lifts it back to the spectral space using the pseudo-inverse $A^+$, and finally forms its dot products with the basis vectors of the ICS (columns of Q).

Table 2 shows the nine basis vectors for $D_9$ calculated using the $S_0(\lambda), S_1(\lambda), S_2(\lambda)$ given in Table 1:

TABLE 2 nine basis vectors for $D_9$ calculated using $S_0(\lambda), S_1(\lambda), S_2(\lambda)$ given in Table 1

| λ (nm) | $v_1$ | $v_2$ | $v_3$ | $v_4$ | $v_5$ | $v_6$ | $v_7$ | $v_8$ | $v_9$ |
|---|---|---|---|---|---|---|---|---|---|
| 400 | −0.011875 | −0.003249 | 0.001965 | −0.035347 | 0.018947 | −0.003853 | 0.019607 | 0.001565 | 0.029608 |
| 410 | −0.055395 | −0.015144 | 0.009065 | −0.149594 | 0.080245 | −0.016519 | 0.128276 | 0.110397 | −0.017834 |
| 420 | −0.162074 | −0.044183 | 0.025683 | −0.364931 | 0.186135 | −0.04018 | 0.323314 | 0.33133 | −0.15341 |
| 430 | −0.311033 | −0.084186 | 0.045463 | −0.500739 | 0.218569 | −0.058124 | 0.265693 | 0.206629 | 0.008561 |

TABLE 2-continued nine basis vectors for $D_0$ calculated using $S_0(\lambda)$, $S_1(\lambda)$, $S_2(\lambda)$ given in Table 1

| λ (nm) | $v_1$ | $v_2$ | $v_3$ | $v_4$ | $v_5$ | $v_6$ | $v_7$ | $v_8$ | $v_9$ |
|---|---|---|---|---|---|---|---|---|---|
| 440 | −0.436527 | −0.116568 | 0.053497 | −0.300667 | 0.035223 | −0.042283 | −0.252814 | −0.365298 | 0.238262 |
| 450 | −0.484596 | −0.12782 | 0.03868 | −0.001847 | −0.120494 | 0.018551 | −0.306019 | −0.227198 | −0.097605 |
| 460 | −0.452687 | −0.117038 | 0.003094 | 0.239251 | −0.162356 | 0.105088 | −0.046635 | 0.0825 | −0.089287 |
| 470 | −0.342855 | −0.081202 | −0.045137 | 0.371834 | −0.115636 | 0.112466 | 0.166842 | 0.22768 | −0.034554 |
| 480 | −0.216745 | −0.033938 | −0.096147 | 0.35469 | 0.008863 | −0.002741 | 0.228897 | 0.133426 | −0.071457 |
| 490 | −0.12373 | 0.011127 | −0.142962 | 0.253533 | 0.149051 | −0.17142 | 0.234132 | 0.101665 | 0.123179 |
| 500 | −0.078215 | 0.056938 | −0.205919 | 0.172496 | 0.250271 | −0.277459 | 0.120204 | −0.02348 | 0.30662 |
| 510 | −0.057771 | 0.113174 | −0.28254 | 0.089491 | 0.319688 | −0.315682 | −0.029465 | −0.169073 | 0.210948 |
| 520 | −0.05059 | 0.176561 | −0.337772 | 0.005908 | 0.265449 | −0.091442 | −0.080454 | −0.188671 | −0.314618 |
| 530 | −0.054734 | 0.236734 | −0.350429 | −0.054257 | 0.143385 | 0.097474 | −0.125473 | −0.050438 | −0.489075 |
| 540 | −0.060429 | 0.279084 | −0.309648 | −0.091034 | 0.008783 | 0.154386 | −0.211798 | 0.165925 | 0.124678 |
| 550 | −0.067113 | 0.31064 | −0.233865 | −0.105731 | −0.133766 | 0.25406 | −0.102373 | 0.192582 | 0.29395 |
| 560 | −0.072828 | 0.327319 | −0.127535 | −0.097699 | −0.238733 | 0.215806 | 0.058602 | 0.094786 | 0.225276 |
| 570 | −0.077516 | 0.334304 | −0.004873 | −0.072005 | −0.291107 | 0.052663 | 0.294205 | −0.184745 | −0.176259 |
| 580 | −0.080828 | 0.333916 | 0.11982 | −0.033461 | −0.267515 | −0.144271 | 0.418048 | −0.387142 | 0.011414 |
| 590 | −0.079144 | 0.314149 | 0.223669 | 0.00616 | −0.137576 | −0.409928 | −0.227003 | 0.272016 | −0.10414 |
| 600 | −0.076339 | 0.293751 | 0.299529 | 0.055943 | 0.03875 | −0.255696 | −0.235022 | 0.248883 | 0.188198 |
| 610 | −0.068571 | 0.258166 | 0.323647 | 0.090157 | 0.187136 | −0.084621 | −0.119055 | 0.061964 | −0.235078 |
| 620 | −0.055436 | 0.205856 | 0.291536 | 0.102226 | 0.27086 | 0.108036 | 0.066865 | −0.168005 | −0.108288 |
| 630 | −0.039848 | 0.146816 | 0.223919 | 0.092873 | 0.283458 | 0.255575 | 0.139514 | −0.223936 | 0.220278 |
| 640 | −0.027264 | 0.099993 | 0.16008 | 0.075609 | 0.264468 | 0.334139 | 0.018449 | −0.03738 | 0.129456 |
| 650 | −0.016902 | 0.061791 | 0.101896 | 0.051214 | 0.194464 | 0.269127 | −0.07175 | 0.085788 | −0.153018 |
| 660 | −0.009838 | 0.035964 | 0.060435 | 0.033544 | 0.13618 | 0.220484 | −0.063301 | 0.088831 | −0.027563 |
| 670 | −0.005356 | 0.019618 | 0.033361 | 0.020632 | 0.087193 | 0.161075 | −0.028257 | 0.04964 | 0.108861 |
| 680 | −0.00272 | 0.009966 | 0.017065 | 0.010977 | 0.047688 | 0.091288 | −0.020406 | 0.034585 | 0.055193 |
| 690 | −0.00124 | 0.004543 | 0.007808 | 0.005048 | 0.02166 | 0.041302 | −0.005923 | 0.011394 | 0.032454 |
| 700 | −0.000398 | 0.00146 | 0.002517 | 0.001692 | 0.007357 | 0.014569 | −0.001795 | 0.003826 | 0.014376 |

FIGS. 9A to 9I are graphs of the basis functions. In general, the basis for $D_n$ is obtained by taking the first n vectors from Table 2.

Although the invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents rather than the foregoing description.

What is claimed is:

1. A method for generating an Interim Connection Space of a full spectral space, the method comprising:
   using a computer programmed to perform steps including:
   accessing a space of illuminants;
   decomposing the full spectral space into a first subspace that is an orthogonal complement of a metameric black subspace for the space of illuminants; and
   generating the Interim Connection Space based on the first subspace.

2. The method of claim 1, wherein the illuminants are the CIE daylight illuminants.

3. The method of claim 1, wherein the first subspace is obtained by singular value decomposition, and decomposing the full spectral space comprises:
   defining the first subspace to be the span of singular vectors that correspond to only non-zero singular values.

4. The method of claim 1, further comprising:
   accessing an upper bound for a dimension value of the Interim Connection Space, wherein decomposing the full spectral space comprises further restricting the dimension of the first subspace to the upper bound for the dimension value.

5. The method of claim 1, wherein the Interim Connection Space comprises a linear map characterizing a linear transformation from the Interim Connection Space to the full spectral space, and a linear map characterizing a linear transformation from the full spectral space to the Interim Connection Space.

6. A method for rendering an image on a color destination device, the method comprising:
   accessing color data of the image in an Interim Connection Space generated by the method of claim 1;
   transforming the color data from the Interim Connection Space into a device dependent color space of the color destination device; and
   rendering the transformed color data on the destination device.

7. The method of claim 6, wherein transforming the color data from the Interim Connection Space includes performing an integration of the spectral reflectance data, the spectral power distribution of a predetermined illuminant, and color matching functions.

8. A method for generating an Interim Connection Space of a full spectral space, the method comprising:
   using a computer programmed to perform steps including:
   accessing a set of basis functions of a space of illuminants;
   generating a first matrix comprising tristimulus color values of the basis functions at predetermined wavelengths;
   decomposing the first matrix to obtain a second matrix of singular column vectors;
   generating the Interim Connection Space based on the second matrix; and
   accessing an upper bound for a dimension value of the Interim Connection Space, wherein decomposing the first matrix comprises restricting the number of nonzero column vectors of the second matrix to the upper bound.

9. The method of claim 8, wherein the basis functions are the basis functions for the CIE model of daylight.

10. A method for generating an Interim Connection Space of a full spectral space, the method comprising:
    using a computer programmed to perform steps including:
    accessing a set of basis functions of a space of illuminants;

generating a first matrix comprising tristimulus color values of the basis functions at predetermined wavelengths;

decomposing the first matrix to obtain a second matrix of singular column vectors; and generating the Interim Connection Space based on the second matrix;

wherein the Interim Connection Space comprises a linear map characterizing a linear transformation from the Interim Connection Space to the full spectral space, and a linear map characterizing a linear transformation from the full spectral space to the Interim Connection Space.

11. An apparatus for generating an Interim Connection Space of a full spectral space, the apparatus comprising:

an accessing unit that accesses a space of illuminants;

a decomposition unit that decomposes the full spectral space into a first subspace that is an orthogonal complement of a metameric black subspace for the space of illuminants; and a generation unit that generates the Interim Connection Space based on the first subspace.

12. The apparatus of claim 11, wherein the illuminants are the CIE daylight illuminants.

13. The apparatus of claim 11, wherein the first subspace is obtained by singular value decomposition, and decomposing of the full spectral space by the decomposition unit comprises:

defining the first subspace to be the span of singular vectors that correspond to only non-zero singular values.

14. The apparatus of claim 11, wherein the accessing unit further accesses an upper bound for a dimension value of the Interim Connection Space, and the decomposing of the full spectral space by the decomposition unit comprises further restricting the dimension of the first subspace to the upper bound for the dimension value.

15. The apparatus of claim 11, wherein the Interim Connection Space comprises a linear map characterizing a linear transformation from the Interim Connection Space to the full spectral space, and a linear map characterizing a linear transformation from the full spectral space to the Interim Connection Space.

16. An apparatus for rendering an image on a color destination device, the apparatus comprising:

a second accessing unit that accesses color data of the image in an Interim Connection Space generated by the method of claim 1;

a first transformation unit that transforms the color data from the Interim Connection Space into a device dependent color space of the color destination device; and a rendering unit that renders the transformed color data on the destination device.

17. The apparatus of claim 16, wherein transforming the color data from the Interim Connection Space includes performing an integration of the spectral reflectance data, the spectral power distribution of a predetermined illuminant, and color matching functions.

18. An apparatus for generating an Interim Connection Space of a full spectral space, the apparatus comprising:

an accessing unit that accesses a set of basis functions of a space of illuminants;

a matrix generation unit that generates a first matrix comprising tristimulus color values of the basis functions at predetermined wavelengths;

a decomposition unit that decomposes the first matrix to obtain a second matrix of singular column vectors; and a generation unit that generates the Interim Connection Space based on the second matrix;

wherein the accessing unit further accesses an upper bound for a dimension value of the Interim Connection Space, and decomposing the first matrix by the decomposition unit comprises restricting the number of nonzero column vectors of the second matrix to the upper bound.

19. The apparatus of claim 18, wherein the basis functions are the basis functions for the CIE model of daylight.

20. An apparatus for generating an Interim Connection Space of a full spectral space, the apparatus comprising:

an accessing unit that accesses a set of basis functions of a space of illuminants;

a matrix generation unit that generates a first matrix comprising tristimulus color values of the basis functions at predetermined wavelengths;

a decomposition unit that decomposes the first matrix to obtain a second matrix of singular column vectors; and a generation unit that generates the Interim Connection Space based on the second matrix;

wherein the Interim Connection Space comprises a linear map characterizing a linear transformation from the Interim Connection Space to the full spectral space, and a linear map characterizing a linear transformation from the full spectral space to the Interim Connection Space.

21. Computer-executable instructions retrievably stored on a computer-readable medium, the computer-executable instructions executable to generate an Interim Connection Space of a full spectral space, said computer-executable process steps comprising process steps executable to perform a method according to any one of claims 1 to 7 and 8 to 9.

22. An apparatus for generating an Interim Connection Space of a full spectral space, the apparatus comprising:

a program memory that stores process steps executable to perform a method according to any one of claims 1 to 7 and 8 to 9; and a processor coupled to the program memory that executes the process steps stored in said program memory.

* * * * *